April 22, 1924.
G. A. MORRISON
1,491,411
REDUCING VALVE
Filed May 25, 1921
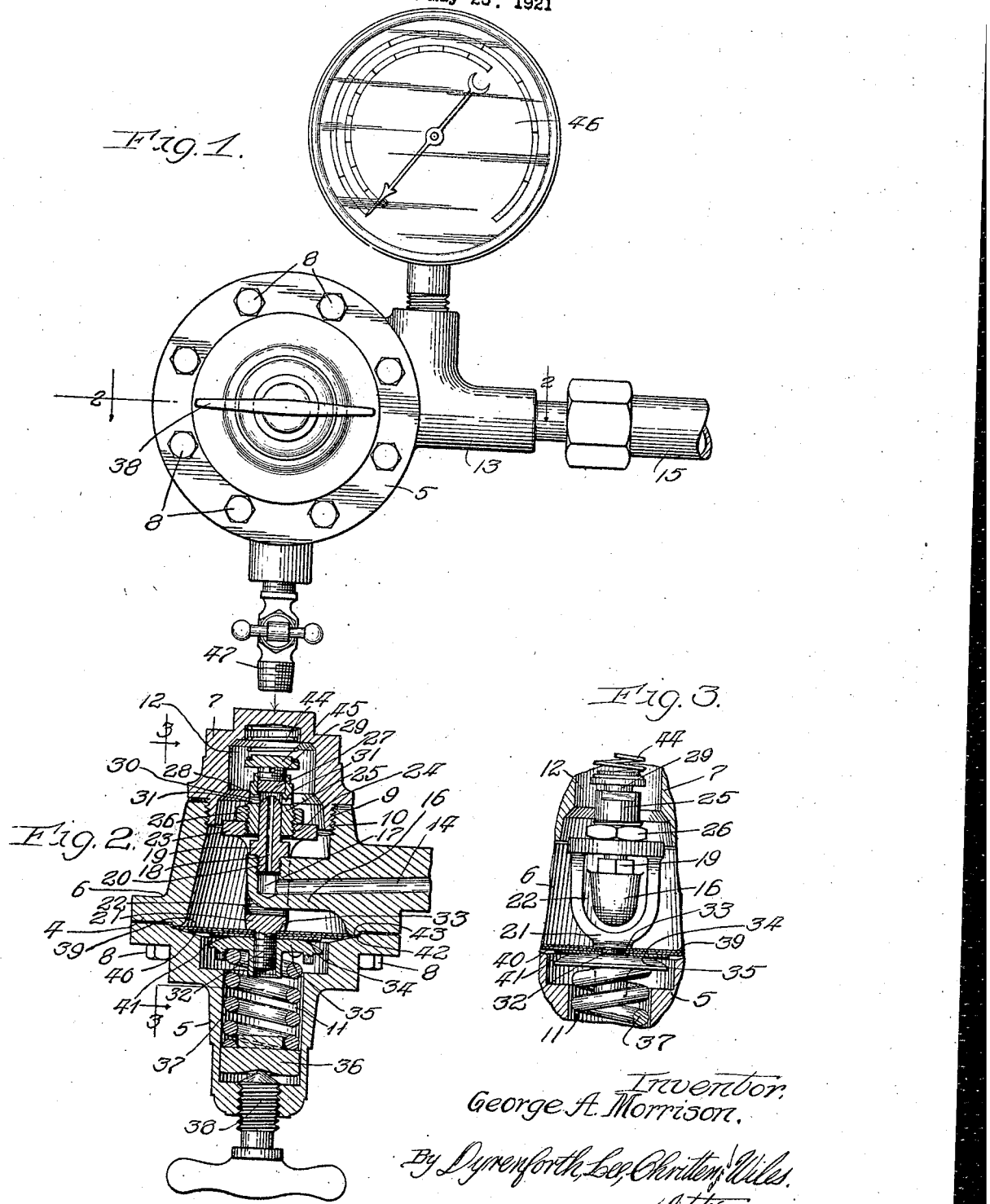
Inventor
George A. Morrison.
By Dyrenforth, Lee, Chritton & Wiles
Attys.

Patented Apr. 22, 1924.

1,491,411

UNITED STATES PATENT OFFICE.

GEORGE A. MORRISON, OF PARK RIDGE, ILLINOIS, ASSIGNOR TO TORCHWELD EQUIPMENT COMPANY, OF CHICAGO, ILLINOIS, A CORPORATION OF DELAWARE.

REDUCING VALVE.

Application filed May 25, 1921. Serial No. 472,394.

*To all whom it may concern:*

Be it known that I, GEORGE A. MORRISON, a citizen of the United States, residing at Park Ridge, in the county of Cook and State of Illinois, have invented a new and useful Improvement in Reducing Valves, of which the following is a specification.

My invention relates, generally stated, to improvements in reducing valves, and more particularly, though not exclusively, to reducing valves for use in reducing fluid pressure under relatively high pressure, to relatively low pressure, my invention having been devised for employment, more particularly, in connection with oxy-acetylene burner equipment wherein one or both of the gases employed is under very high pressure, though the invention is not limited to use in connection with such systems.

Generally stated, my primary object is to provided a novel, simple and positively operating valve mechanism whereby the gas controlled thereby is caused to be delivered from the source thereof to the point of use in a steady stream under uniform, constant, reduced pressure.

My invention constitutes as to a certain feature thereof, an improvement upon reducing valves of the diaphragm type which structures, as hitherto provided, have presented certain objections rendering their operation imperfect, to the end that danger of the diaphragm becoming set in distorted condition is avoided and substantially constant uniform steady flow of the pressure from the reducing valve is effected.

Referring to the accompanying drawings:

Figure 1 is a view in elevation of a reducing valve constructed in accordance with my invention. Figure 2 is a section taken at the line 2—2 on Fig. 1 and viewed in the direction of the arrows; and Figure 3, a broken view taken at the irregular line 3—3 on Fig. 2 and viewed in the direction of the arrows.

The particular, illustrated, embodiment of my invention comprises a casing 4 shown as formed of three sections 5, 6 and 7 disposed in alinement, the sections 5 and 6 being connected together by means of the bolts 8 and the section 7 screwing at a threaded reduced portion 9 thereof, into the threaded end portion 10 of the section 6, the section 7 being hollow with the opening therein extending through opposite ends of this section and the sections 5 and 7 containing recesses 11 and 12, respectively which oppose the opposite, open ends of the casing section 6. The section 6 is shown as formed with a boss 13 containing a passage 14 which, at one end communicates with a pipe 15 which would lead to the supply of fluid pressure to be reduced, the passage 14 being continued through a boss 16 on the section 6 and extending into the interior thereof, the passage 14 opening into a recess 17 in the end of the boss 16, the recess 17 connecting with a passage 18 in a tip 19 screwed at its threaded, reduced, end 20 into this recess, the structure just referred to constituting a nozzle through which the fluid pressure to be reduced by the valve, passes from the source of supply. The structure shown also involves a closed yoke 21 the aperture therein being represented at 22, this yoke being positioned relative to the boss 16 and tip 19 as shown and moving, as hereinafter described in the plane of the axis of the tip. The end portion 23 of the yoke, adjacent the tip 19, contains a threaded aperture 24 into which is screwed a sleeve 25 to be adjustable therein, a locknut 26 serving to hold the sleeve in adjusted position on the yoke. The outer end of the sleeve carries a seat adapted to cooperate with the outer end of the tip 19 for controlling the passage of the fluid pressure therethrough, this seat being shown as formed of a disk 27 of any suitable material, such as that commonly employed in structures of this general character, which abuts an annular seat 28 and is held in place against the latter by means of a nut 29 screwing into the outer open end of the sleeve 25. The outer end of the tip 19 is shown as of tapering form as represented at 30, and the sleeve 25 contains a series of openings 31 communicating with the interior of the sleeve and with the recess 12. The seat 27 is set in from the end of the sleeve opposite that at which it is located, a considerable distance, as shown, and this sleeve and tip 19 are so constructed that the tip operates as a guide for the yoke 21 to avoid tilting of the seat 27 relative to the tip, the opening through the sleeve 25, and the portion of the tip extending into this opening, being preferably of cylindrical shape as shown.

The end of the yoke 21 opposite that carrying the sleeve 25 is formed with a threaded portion 32 of reduced diameter thereby presenting an annular shoulder 33 at which portion the diaphragm represented generally at 34 is connected with the yoke, the diaphragm being centrally apertured to receive the stud portion 32 and being clamped against the shoulder 33 by a nut 35 screwing upon the stud 32, there being interposed between the nut 35 and a block 36 located within the recess 11 and adjustable lengthwise of the latter, a coil spring 37, the tension of this coil spring being regulated by means of a screw 38 threaded in the casing section 5 and bearing against the block 36.

The diaphragm 34 is formed of a plurality of flatwise opposing disks of any suitable material, such as that commonly employed in diaphragms of devices of this general character, these disks being of different sizes and having no connection with each other. In the particular construction shown the diaphragm comprises three disks 39, 40 and 41, each of a different diameter, the disk 39 being the larger, the disk 41 the smaller and the disk 40 of greater diameter than the disk 41 but smaller than the disk 39, the disks 40 and 41 being located at the side of the diaphragm opposite that at which the pressure of the fluid is exerted. The diaphragm disk 39 serves as a closure for this end of the chamber presented by the casing section 6 preventing escape of the fluid pressure past the diaphragm, it being preferred that the diaphragm disk 39 be formed as a flat plate and that the opposing edges of the sections 5 and 6 between which the diaphragm is clamped at the edges of the latter, be formed with the oppositely-extending annular offsets 42 and 43, respectively, whereby in the assembly of the parts the flat marginal edge of the plate 39 is forced into conformance with these opposing surfaces of the sections 5 and 6, effecting thereby a very tight joint between the disk and the casing.

The structure is preferably formed with a compensating spring as is commonly provided in structures of this general character, this compensating spring device comprising a coil spring 44 interposed between the end of the section 7 and a disk 45 which latter bears against the outer end of the nut 29 and tends to force the valve seat 27 toward the tip 19.

In the arrangement shown a pressure gage, represented at 46, is provided, this gage being in communication with the passage 14, by a branch passage (not shown) in the boss 13 and leading into the gage.

The operation of the valve will be readily understood from the foregoing, it being understood that the fluid pressure enters the device through the passage 14, thence through the passage 18 in the tip and into the sleeve 25 from which it passes, through the openings 27 into the interior of the casing, passing from the latter through an outlet 47 which is in communication with the interior of the structure formed of the casing sections 6 and 7. The fluid pressure entering the casing as stated, exerts itself against the diaphragm 34, the resistance of which to movement depends upon the adjustment of the screw 38. When the pressure in the casing builds up to a point where the tension of the spring 37 is overcome by the pressure, the yoke 21, moving with the diaphragm, draws the seat 27 toward the outlet of the tip 30, the general principle of operation of the structure being the same as that of devices of a similar type as hitherto provided.

The provision of the diaphragm, as shown and described, is of great advantage in that the valve mechanism operates to render more steady a constant flow of reduced fluid pressure from the valve device. While the diaphragm may be made sufficiently flexible to adapt it to function properly, the portion of the diaphragm at which the diaphragm is held at its edges in place, is caused to be reenforced by the plate, or plates, as the case may be, which flatwise oppose it. Furthermore, by constructing the diaphragm as stated, danger of the diaphragm becoming set in distorted condition under subjection to high pressure is minimized, it having been found in practice that whereas diaphragms constructed in accordance with prior practices become set in distorted condition when subjected to high pressures and are thus impaired for properly performing their function, a diaphragm constructed in accordance with my invention, even though repeatedly subjected to high pressures and for a prolonged length of time, does not become set in distorted condition but returns to normal position and continues to properly perform its function.

Another feature of advantage of a construction constructed in accordance with my invention resides in the manner of guiding the yoke 21 in its movements. Heretofore, so far as I am aware, the guiding of the yoke has been effected by means of its guiding engagement with a member screwed into the end of the casing beyond the nozzle, such a structure presenting the disadvantage of the non-accurate fitting of the seat and nozzle in the closed position of the structure. It will be manifest that this disadvantage is avoided in my construction as the yoke slides on the nozzle and thus insures the proper seating of the seat against the nozzle.

The feature of providing for the adjustment of the collar 25 in the yoke is of advantage as it enables wear of the seat 12 to be compensated for and permits of the proper adjustment of the seat relative to the nozzle in the initial assembly of the parts, regardless of variations in thicknesses of the seat-forming part.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

In a reducing valve, the combination of a casing formed of end sections and an intermediate section, said end sections being hollow and said intermediate section having an opening extending therethrough and communicating at its opposite ends with the spaces in said end sections, a nozzle carried by said intermediate section and opening in the direction of the longitudinal plane of said casing, said casing containing a passage for supplying to the nozzle the fluid pressure to be reduced, a yoke into which said nozzle extends, said yoke being formed with a member adjustably mounted on the body of the yoke and containing a socket into which said nozzle extends and forming guiding means for the yoke, a seat carried by said member and forming the end wall of said socket, the wall of said socket being apertured for the flow of fluid pressure therefrom into the interior of the casing, a diaphragm carried by said yoke adjacent the end thereof opposite said seat, said diaphragm being held in position between said intermediate section and one of said end sections, and a spring located within said last-referred-to end section and operating to force said yoke in a direction opposite that in which the fluid pressure tends, by engaging said diaphragm, to force said yoke.

GEORGE A. MORRISON.